United States Patent [19]

Talarmo

[11] Patent Number: 5,790,938
[45] Date of Patent: Aug. 4, 1998

[54] METHOD FOR CONTROLLING A SUBSCRIBER STATION IN A MOBILE RADIO SYSTEM

[75] Inventor: Reino Talarmo, Riihimäki, Finland

[73] Assignee: Nokia Telecommunications Oy, Espoo, Finland

[21] Appl. No.: 637,722

[22] PCT Filed: Nov. 1, 1994

[86] PCT No.: PCT/FI94/00492

§ 371 Date: Apr. 30, 1996

§ 102(e) Date: Apr. 30, 1996

[87] PCT Pub. No.: WO95/12956

PCT Pub. Date: May 11, 1995

[30] Foreign Application Priority Data

Nov. 1, 1993 [FI] Finland ................................ 934826

[51] Int. Cl.⁶ .................................................. H04B 7/15
[52] U.S. Cl. ...................... 455/11.1; 455/422; 455/450; 455/455; 455/509
[58] Field of Search .............................. 455/422, 450, 455/452, 456, 509, 517, 526, 11.1, 524, 575, 550; 370/315

[56] References Cited

U.S. PATENT DOCUMENTS

| | | | |
|---|---|---|---|
| 3,955,140 | 5/1976 | Stephens et al. | 455/11.1 |
| 4,284,848 | 8/1981 | Frost . | |
| 4,534,061 | 8/1985 | Ulug | 455/17 |
| 4,553,263 | 11/1985 | Smith et al. . | |
| 5,126,733 | 6/1992 | Sagers et al. | 455/456 |
| 5,423,055 | 6/1995 | Diaz et al. | 455/15 |
| 5,594,947 | 1/1997 | Grube et al. | 455/509 |
| 5,612,948 | 3/1997 | Fette et al. | 455/11.1 |
| 5,613,206 | 3/1997 | Bantz et al. | 455/450 |
| 5,666,661 | 9/1997 | Grube et al. | 455/509 |

FOREIGN PATENT DOCUMENTS

| | | |
|---|---|---|
| 0 433 256 | 6/1991 | European Pat. Off. . |
| 0433256 | 6/1991 | European Pat. Off. . |
| 0541026 | 5/1993 | European Pat. Off. . |
| 63-51727 | 3/1988 | Japan . |
| 5-167704 | 7/1993 | Japan . |
| 2245126 | 12/1991 | United Kingdom . |
| WO 93/16566 | 8/1993 | WIPO . |

OTHER PUBLICATIONS

Patent Abstracts of Japan, vol. 17, No. 575,E-1449, Abstract of JP.A, 5-167704 (Casio Comput Co Ltd), 2 Jul. 1993.
Patent Abstract of Japan, vol. 12, No. 268, E-638, Abstract of JP.A, 63-51727 (NEC Corp), 4 Mar. 1988.
G. E. Dodrill and J.F. Atkinson, Using radio links and relays, Communication Engineering pp. 15-17, Jan. 1954.

*Primary Examiner*—Nguyen Vo
*Assistant Examiner*—Darnell R. Armstrong
*Attorney, Agent, or Firm*—IP Group of Pillsbury Madison & Sutro LLP

[57] ABSTRACT

A method for controlling a subscriber station operating on a direct mode channel in a mobile radio system. The mobile radio system is one which includes a radio network with at least one base station and subscriber stations, and at least one subscriber database and further, at least one repeater station, which forwards traffic between the at least one base station and the subscriber stations operating on a direct mode channel. In the method, a subscriber station is registered in a radio network via a base station. The subscriber station transmits a detachment message to the base station, and indicates that it is switching to operate on a direct mode channel. In order that the radio network is able to control and communicate with the subscriber station switched to the direct mode channel, the identifier of the repeater station via which repeater station operating on the direct mode channel can be reached by the radio network, is transmitted to the radio network. The identifier of the repeater station is stored in the at least one subscriber database of the radio network.

10 Claims, 1 Drawing Sheet

METHOD FOR CONTROLLING A SUBSCRIBER STATION IN A MOBILE RADIO SYSTEM

This application claims benefit of international application PCT/FI94/00492, filed Nov. 1, 1994.

FIELD OF THE INVENTION

The present invention relates to a method for controlling a subscriber station operating on a direct mode channel in a mobile radio system, this mobile radio system comprising a radio network with at least one base station and subscriber stations, and at least one subscriber database, and further, at least one repeater station, which forwards traffic between one at least one base station and the subscriber stations operating on a direct mode channel. In the method, a subscriber station is registered in a radio network via a base station; the subscriber station transmits a detachment message to the base station, and indicates that it is switching to operate on a direct mode channel.

BACKGROUND OF THE INVENTION

The invention relates to the field of mobile phone systems. A subscriber in a mobile phone system, i.e. a subscriber station, for instance a mobile phone or some other means of communication, may be registered in a radio network or system, whereby it is registered in the radio network via system and traffic channels maintained by the base stations of the radio network.

In addition to the system channels in mobile phone systems, so-called direct mode channels can also be used in connection with a mobile radio system, i.e. direct mode operation is applied. Subscriber stations using direct mode operation do not communicate directly with the radio network or its base stations. Direct mode channels are frequencies at which mobile phones or other means of communication are able to communicate directly with each other without the system.

Direct mode channels are typically used in situations where, for instance, a group of portable mobile phones are communicating with each other at such a long distance from the base station that system channels cannot be used.

Another important way of using direct mode channels is to increase the capacity when the traffic in the system increases fast in some part of the service area of the system, for instance in some point-like part.

A direct mode channel is referred to with terms direct or simplex channel, or a simplex connection. A direct mode channel is a channel which is typically not at all used by the system. It may be, for instance, a channel of the breadth of the channels of the system, for instance 12.5 kHz or 25 kHz. Among the mobile phones operating on a direct mode channel, the transmitting station has tuned its transmitter to the channel and transmits speech or data information. The other mobile phones set to direct mode operation have tuned their receivers to the same channel, whereby they are able to directly hear the transmission.

One form of a direct mode channel is a direct mode channel equipped with a repeater, which direct mode channel comprises a separate repeater station in addition to the subscriber stations, this repeater station forwarding traffic between the subscriber stations using the direct mode channel. In this case, the traffic on the direct mode channel takes place on the semiduplex principle.

Operation on a direct mode channel may take place on the analog or digital modulation principle. A mobile phone transmitting on the channel may also transmit signalling information, such as information on rights of use and priorities or on the group operating on the channel. On the direct mode channel, an encryption may be carried out or plain speech can be transmitted.

Subscriber stations using direct mode operation communicate with other subscriber stations on a direct mode channel without being in direct contact with the base stations of the radio network. The subscriber stations using direct mode operation can however communicate with the radio network via repeater stations. A repeater station is a piece of equipment comprising two radio apparatuses connected to each other. The repeater station transmits the information messages transmitted on the direct mode channel to desired network elements, for instance to the base stations of the radio network, these base stations transmitting the information messages further to the switching centres of the radio network.

In solutions according to prior art, when a subscriber station, for instance a mobile phone or some other means of communication, switches to operate on a direct mode channel, the radio network or system which the subscriber has been registered in does not receive information on how information messages could be transmitted to the subscriber. The subscriber station that has switched to direct mode operation, i.e. to operate on a direct mode channel, cannot thus be reached by the radio network.

Similarly, when a subscriber station starts to operate on a direct mode channel, the radio network loses its ability to control the operation of the subscriber station, i.e. the radio network is not able to command the subscriber station switched to the direct mode channel to operate the way the radio network wants.

Furthermore, the problem with the presented solutions according to prior art is that when a subscriber station has switched to communicate on a direct mode channel, and the radio network is not aware of the location of the subscriber station, the radio network may page the subscriber to no avail on the system channels of its own service area, even though the subscriber station has moved outside the system.

SUMMARY OF THE INVENITON

The object of the present invention is to solve the above-mentioned problems associated with the solutions according to prior art. That is, the object is to make it possible to control the subscriber station switched to direct mode operation and to reach it from the radio network from which the subscriber station has switched to direct mode operation.

This new type of method for controlling a subscriber station operating on a direct mode channel in a radio network is achieved with the method of the invention, characterized in that to the radio network is transmitted the identifier of the repeater station via which repeater station the subscriber station operating on a direct mode channel can be reached by the radio network, the identifier of the repeater station being stored in the at least one subscriber database of the radio network.

The invention further relates to a radio network comprising at least one base station; subscriber stations registered in the base stations; at least one repeater station, which forwards traffic between the at least one base station and subscriber stations operating on a direct mode channel; and at least one storage means for maintaining the subscriber database of the radio network. The radio network of the invention is characterized in that the storage means is arranged so as to store the identifier of the repeater station via which the subscriber station operating on a direct mode channel can be reached by the radio network.

The invention is based on the idea that when a subscriber station belonging to a mobile radio system detaches from the base stations of the radio network, the information on how the subscriber can be reached after it has switched to operate on a direct mode channel is transmitted to the radio network, or primarily to its subscriber database. One way to do this is to transmit the identifier of the repeater station via which the subscriber station switched to a direct mode channel can be reached by the radio network.

According to the invention, transmitting the identifier of the repeater station can be performed in such a manner that the subscriber station transmits the identifier of the repeater station directly to the base station of the radio network, in which case the subscriber station has been aware of the identifier of the repeater station earlier, or it has requested the identifier of the repeater station from the repeater station on the direct mode channel.

The other alternative to implement the invention is one where a subscriber station switched to a direct mode channel transmits a special presence message to the base station of the radio network via the repeater station. This message may contain the identifier of the repeater station, this identifier being set by the subscriber station, by means of which repeater station the subscriber station operating on the direct mode channel can be contacted by the radio network; or, the identifier of the repeater station is added to the presence message only at the repeater station as it forwards the presence message of the subscriber station to the base station of the radio network in order for it to be stored in the subscriber database of the radio network.

An advantage with this type of method for controlling a subscriber station operating on a direct mode channel in a mobile radio system and with the mobile radio system is that since the data on how the subscriber station can be reached is stored in the network database in the method of the invention, the network can thus control the operation of the subscriber station switched to a direct mode channel. The network may for instance command the subscriber station to switch to the control channel of the system or to some particular traffic channel. Furthermore, the network may command a subscriber station switched to a direct mode channel to perform a required function or service.

Another advantage of the invention is that the network may transmit messages and calls to the subscriber station operating on a direct mode channel.

Yet another advantage of the invention is that since the network knows where the subscriber station is located and how it can be reached, it is not necessary for the network to perform unnecessary pagings of the subscriber station.

BRIEF DESCRIPTION OF THE DRAWING

The invention is further described in the following with reference to the appended drawings, in which.

DETAILED DESCRIPTION OF PREFERRED EMBODIMENTS OF THE INVENTION

Figure 1:
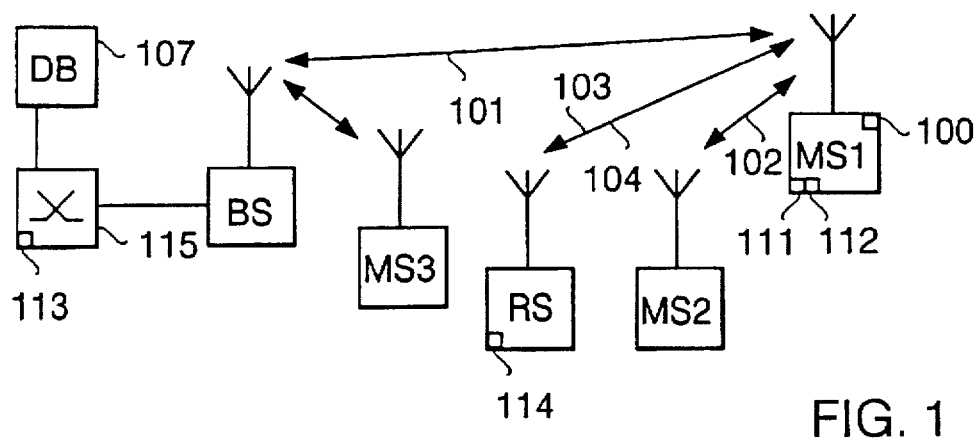
FIG. 1 shows a signalling diagram of the operation of an embodiment of the invention in which a subscriber station switching to a direct mode channel transmits directly to the radio network the identifier of the repeater station via which the subscriber station can be reached.

FIG. 1 shows a signalling diagram of the operation of an embodiment of the invention in which a subscriber station MS1 switching to a direct mode channel transmits to the radio network, typically to its base station BS, the identifier of the repeater station RS via which repeater station RS the subscriber station MS1 can be reached. The figure also shows another subscriber station MS3 registered in the radio network via the base station BS. It is thus assumed that the storage means 100 of the subscriber station MS1 stores the identifier of the repeater station via which the subscriber station can be reached by the radio network after it has switched to communicate on the direct mode channel. When switching to the direct mode channel or before that, the subscriber station transmits 101 the identifier of the repeater station RS to the base station BS of the radio network in a detachment message 101. After this, the subscriber station MS1 switches 102 to operate on the direct mode channel with other subscriber stations MS2. At the same time, the radio network, i.e. its base station BS, receives the detachment message 101 transmitted by the subscriber station MS1, and stores 107 the identifier of the repeater station RS contained therein in its subscriber database DB.

In another embodiment of the invention, the subscriber MS1 switching to a direct mode channel does not know the identifier of the repeater station RS via which it can be contacted after the subscriber station MS1 has switched to use a direct mode channel 102. The subscriber station MS1 thus requests the identifier of the repeater station RS from this repeater station by transmitting 103 an inquiry message to the repeater station RS on the direct mode channel. After having received this message, the repeater station transmits 104 its identifier to the subscriber station MS1 in a reply message on the direct mode channel. It is also significant that the subscriber station may gain knowledge of the identifier of the repeater station in such a manner that the repeater station broadcasts its own identifier at repeated intervals on the direct mode channel, and the subscriber station waits for so long that it receives the identifier of the receiver station when switching to the direct mode channel. In any case, after having received the identifier of its repeater station, the subscriber station MS1 transmits 101 the identifier of the repeater station to the radio network, typically to its base station, in a detachment message. After this, the operation of the invention is carried out in the same manner as illustrated in the description of the embodiment above in connection with the description of this drawing. Stages 107 and 102 are thus carried out.

In addition to the above, FIG. 1 shows an inventive subscriber station MS1 capable of operating on a direct mode channel in a radio system. The subscriber station MS1 comprises means 111 for transmitting the identifier of the repeater station to the base station BS of the radio network, this identifier being transmitted, for instance, in a detachment message transmitted by the subscriber station. The subscriber station transmits the detachment message when it wants to inform the radio network that the subscriber station is switching to operate on a direct mode channel.

The subscriber stations MS1 according to the invention further comprise means 112 for requesting the identifiers of the repeater stations RS from these repeater stations. This request is performed if the subscriber station does not know the identifier of the repeater station via which this subscriber station can be reached by the radio network after the subscriber station has switched to operate on a direct mode channel.

The radio network shown in FIG. 1, for instance its switching centre 115, comprises means 113 for receiving and storing in the subscriber database DB the identifiers of the repeater stations RS transmitted by the subscriber stations MS1 and MS2 operating on the direct mode channel. Naturally, the means 113 can also be located somewhere else in the radio network, besides the switching centre. An alternative location could be for instance the base station or the immediate vicinity of the database.

The inventive repeater station RS shown in FIG. 1 comprises means 114 for transmitting its identifier on the direct mode channel for those subscriber stations MS1, MS2 which have requested the identifiers of the repeater stations. It is also possible that the repeater station RS broadcasts its identifier at repeated intervals on the direct mode channel, and the subscriber station receives it by listening to the direct mode channel.

Figure 2:
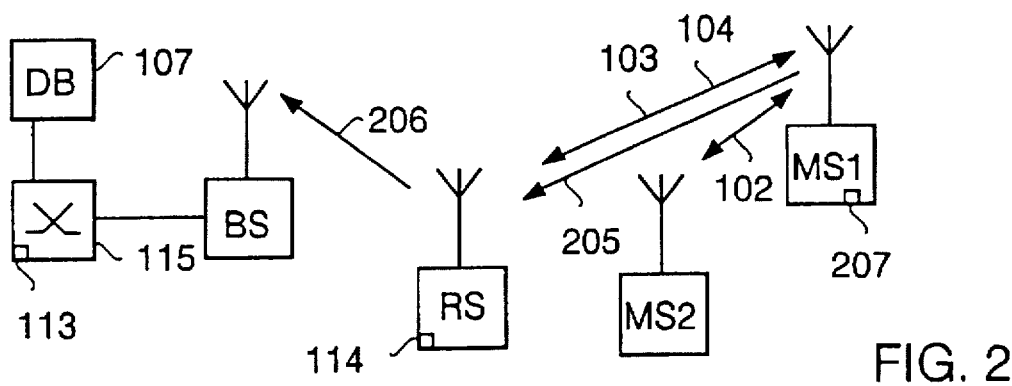
FIG. 2 shows a signalling diagram of the operation of an embodiment of the invention in which a subscriber station switched to a direct mode channel requests the identifier of its repeater station from this repeater station, and adds it to the detachment message which it transmits via its repeater station to the radio network.

FIG. 2 shows a signalling diagram of the operation of an embodiment of the invention in which the subscriber station MS1 switching to a direct mode channel requests the identifier of its repeater station RS from this repeater station, and adds it to the detachment message which it transmits via its repeater station RS to the radio network.

In this embodiment, the subscriber station MS1 switches 102 to operate on said direct mode channel. On the direct mode channel, the subscriber station MS1 requests the identifier of the repeater station from this repeater station by transmitting 103 an inquiry message to the repeater station RS on the direct mode channel. The repeater station transmits 104 its identifier to the subscriber station in a reply message on the direct mode channel. The alternative to this embodiment is that the repeater station RS broadcasts its identifier at repeated intervals on the direct mode channel, and the subscriber station receives it by listening to the direct mode channel. After having received the identifier of the repeater station, the subscriber station transmits 205 a detachment message including this identifier to the repeater station on the direct mode channel, the repeater station transmitting 206 the detachment message including its identifier to the radio network, typically to its base station. The base station transmits the detachment message further to the radio network, for instance to its switching centre 115 and the subscriber database DB. The radio network thus receives 107 the detachment message transmitted by the subscriber station, and stores the identifier of the repeater station included therein in its subscriber database DB.

The inventive subscriber station MS1 shown in FIG. 2 comprises means 207 for transmitting a detachment message to the repeater station RS on the direct mode channel.

Similarly, the repeater station RS shown in FIG. 2 comprises means 114 for transmitting its identifier on the direct mode channel for those subscriber stations MS1, MS2 which have requested the identifiers of the repeater stations. It should be noted that this transmission of the identifier may take place at the request of the subscriber stations MS1, MS2, or it may occur automatically at desired intervals.

Figure 3:
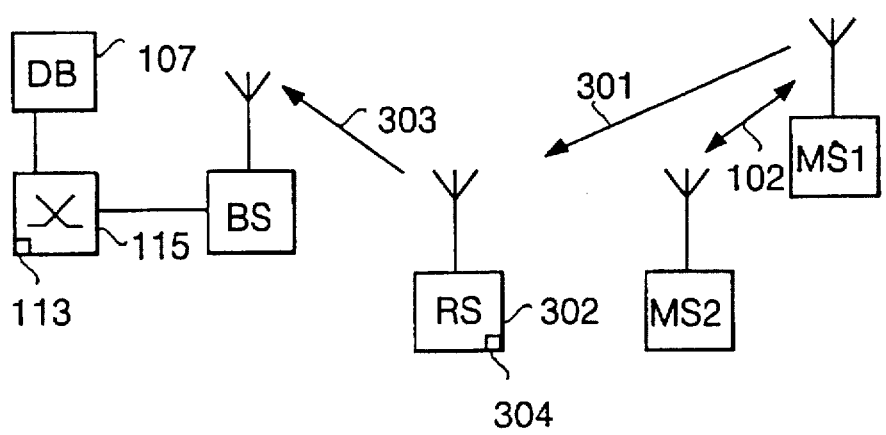
FIG. 3 shows a signalling diagram of the operation of an embodiment of the invention in which a subscriber station switching to a direct mode channel transmits a detachment message to its repeater station on the direct mode channel, this repeater station adding its own identifier to this message and forwarding it to the radio network.

FIG. 3 shows a signalling diagram of the operation of an embodiment of the invention in which the subscriber station MS1 switching to a direct mode channel transmits a detachment message on the direct mode channel to the repeater station RS, which adds its own identifier to it, and transmits said message to the radio network.

In this embodiment of the invention, when switching 102 to operate on the direct mode channel, the subscriber station MS1 transmits 301 a detachment message on the direct mode channel to the repeater station RS to be transmitted further to the radio network. After having received the detachment message, the repeater station RS adds 302 its identifier to said detachment message, and transmits 303 the detachment message including its identifier to the radio network, typically to its base station BS. The radio network receives 107 the detachment message transmitted by the subscriber station, and stores the identifier of the repeater station included therein in its subscriber database DB.

The inventive repeater station RS shown in FIG. 3 comprises means 304 for adding its identifier to a detachment message 303 to be transmitted to the base station BS of the radio network. Typically, the subscriber station MS1, MS2 transmits a detachment message 301, which the repeater station RS receives and to which the repeater station RS adds its own identifier. After this, the repeater station transmits the detachment message 303 including its identifier further to the base station BS of the radio network.

The drawings and the description relating to them are only intended to illustrate the idea of the invention. In its details, the method according to the invention for controlling a subscriber station operating on a direct mode channel in a mobile radio system, and a mobile radio system, can vary within the scope of the claims. Even if the invention has been described above mainly in connection with radio systems, the invention can also be used in other types of telecommunication systems that are based on radio paths.

I claim:

1. A method for controlling a subscriber station operating on a direct mode channel in a mobile radio system, this mobile radio system comprising a radio network having at least one base station and a plurality of subscriber stations capable of operating on a direct mode channel, and at least one subscriber database, and further, at least one repeater station having an identifier and which is arranged to forward traffic between the at least one base station and those of the subscriber stations which are operating on a direct mode channel, said method comprising the steps of:
   registering a respective one of said subscriber stations in the radio network via a respective said base station;
   said subscriber station transmitting a detachment message to said base station;
   said subscriber station indicating that said subscriber station is switching to operate on a direct mode channel;
   transmitting to the radio network the identifier of a respective said repeater station via which repeater station said subscriber station operating on a direct mode channel can be reached by the radio network; and
   storing the identifier of said repeater station in said at least one subscriber database.

2. A method according to claim 1, further comprising the steps of:
   storing by said subscriber station of said identifier of said repeater station;
   the subscriber station transmitting said identifier of said repeater station to said base station of the radio network in said detachment message;

the subscriber station switching to operate on a direct mode channel;

the radio network receiving said detachment message transmitted by said subscriber station, including said identifier of said repeater station contained therein.

3. A method according to claim 1, the method further comprising the steps of:

said subscriber station requesting said identifier of said repeater station from said repeater station by transmitting an inquiry message to the repeater station on said direct mode channel;

said repeater station transmitting said identifier to said subscriber station in a reply message on said direct mode channel;

the subscriber station transmitting said identifier of said repeater station to the radio network in said detachment message;

the radio network receiving said detachment message transmitted by the subscriber station; and said subscriber station switching to operate on said direct mode channel.

4. A method according to claim 1, further comprising the steps of:

said subscriber station switching to operate on said direct mode channel;

said subscriber station requesting the identifier of the repeater station from said repeater station by transmitting an inquiry message to said repeater station on said direct mode channel;

said repeater station transmitting said identifier to said subscriber station in a reply message on said direct mode channel;

said subscriber station, when transmitting said detachment message, including said identifier of said repeater station to said repeater station on said direct mode channel to which said subscriber station has switched;

said repeater station transmitting said detachment message including said identifier to the radio network;

the radio network receiving said detachment message transmitted by said subscriber station; and the radio network storing said identifier of said repeater station included therein in said at least one subscriber database.

5. A method according to claim 1, further comprising the steps of:

said subscriber station switching to operate on a direct mode channel;

said subscriber station transmitting said detachment message on said direct mode channel to said repeater station to be transmitted further to the radio network;

said repeater station adding the identifier of said repeater station to said detachment message;

said repeater station transmitting said detachment message including said identifier to the radio network; and the radio network receiving said detachment message including said identifier transmitted by said subscriber station.

6. A mobile radio system, comprising:

a radio network having at least one base station, said radio network having at least one subscriber database;

a plurality of subscriber stations arranged to be alternatively registered in said at least one base station, and detached therefrom and operating on a direct mode channel;

at least one repeater station having a respective identifier, each such repeater station being arranged to forward traffic between said at least one base station and those of said subscriber stations which are operating on a direct mode channel;

said at least one subscriber database being arranged to store the respective said identifier of the respective said repeater station via which repeater station each respective said subscriber station operating on a direct mode channel can be reached by the radio network.

7. A mobile radio system according to claim 6, wherein:

each said subscriber station operating on a direct mode channel comprises storing means for storing the respective said identifier of the respective said repeater station which is arranged to forward traffic between that subscriber station and the radio network, and transmitting means for transmitting the respective said identifier of the respective said repeater station to said at least one base station of the radio network; and the radio network comprises means for receiving and storing in said at least one subscriber database each said identifier of each said repeater station as transmitted by each said subscriber station when operating on a direct mode channel.

8. A mobile radio system according to claim 6, wherein:

each said subscriber station operating on a direct mode channel comprises means for requesting the respective said identifier from each said repeater station;

each repeater station comprises means for transmitting the respective said identifiers thereof to each said subscriber station operating on a direct mode channel using the respective direct mode channel; and the radio network comprises means for receiving and storing in said at least one subscriber database each identifier of each said repeater station as transmitted by each said subscriber station when operating on a direct mode channel.

9. A mobile radio system according to claim 6, wherein:

each said subscriber station comprises means for transmitting a detachment message to a respective said repeater station on a direct mode channel; and each repeater station comprises means for adding its respective said identifier to the respective said detachment message as received thereby as a result of said transmitting, for sending to a respective said base station of the radio network.

10. A mobile radio system according to claim 7, wherein:

each said subscriber station operating on a direct mode channel of the radio system comprises means for requesting the respective identifier a respective said repeater station from the respective said repeater station; and each said repeater station comprises means for transmitting the respective said identifier thereof to the respective said subscriber station on a direct mode channel.

\* \* \* \* \*